United States Patent [19]
Longworth et al.

[11] 3,913,937
[45] Oct. 21, 1975

[54] UNIVERSAL AXLE PAD AND CLAMP ASSEMBLIES FOR VEHICLE SUSPENSIONS

[75] Inventors: William F. Longworth; Attila J. Tamas, both of Lexington, Ky.

[73] Assignee: Dura Corporation, Southfield, Mich.

[22] Filed: July 3, 1974

[21] Appl. No.: 485,446

[52] U.S. Cl............... 280/104.5 A; 267/52; 180/85
[51] Int. Cl.²........................................ B60G 9/00
[58] Field of Search ............. 280/104.5 A, 104.5 B; 180/24.01, 24.02, 24.03, 85; 267/54 R, 54 A, 52

[56] References Cited
UNITED STATES PATENTS
3,749,196   7/1973   Traylor .............................. 267/52

*Primary Examiner*—Philip Goodman
*Assistant Examiner*—John A. Carroll
*Attorney, Agent, or Firm*—Hill, Gross, Simpson, Van Santen, Steadman, Chiara & Simpson

[57] ABSTRACT

A universal axle pad and clamp assembly for connecting leaf spring means with an axle housing in a vehicle suspension, includes spring cap means, spring seat and axle pad means including a spring seat member and an axle pad adapter relatively adjustably engagedly related, axle clamp means including an axle clamp member and an axle clamp adapter relatively adjustably engagedly related, and U-bolt means for securing the spring cap, the spring seat and axle pad means and the axle clamp means in fixed clamped relation to spring means received between the cap and spring seat member and an axle housing received between the axle pad adapter and the axle clamp adapter. The arrangement provides for adjustments to attain required pinion angle and the adapters can be readily provided to receive various axle housing sizes and assembled with the other parts of the assembly which may be of a standard size.

11 Claims, 5 Drawing Figures

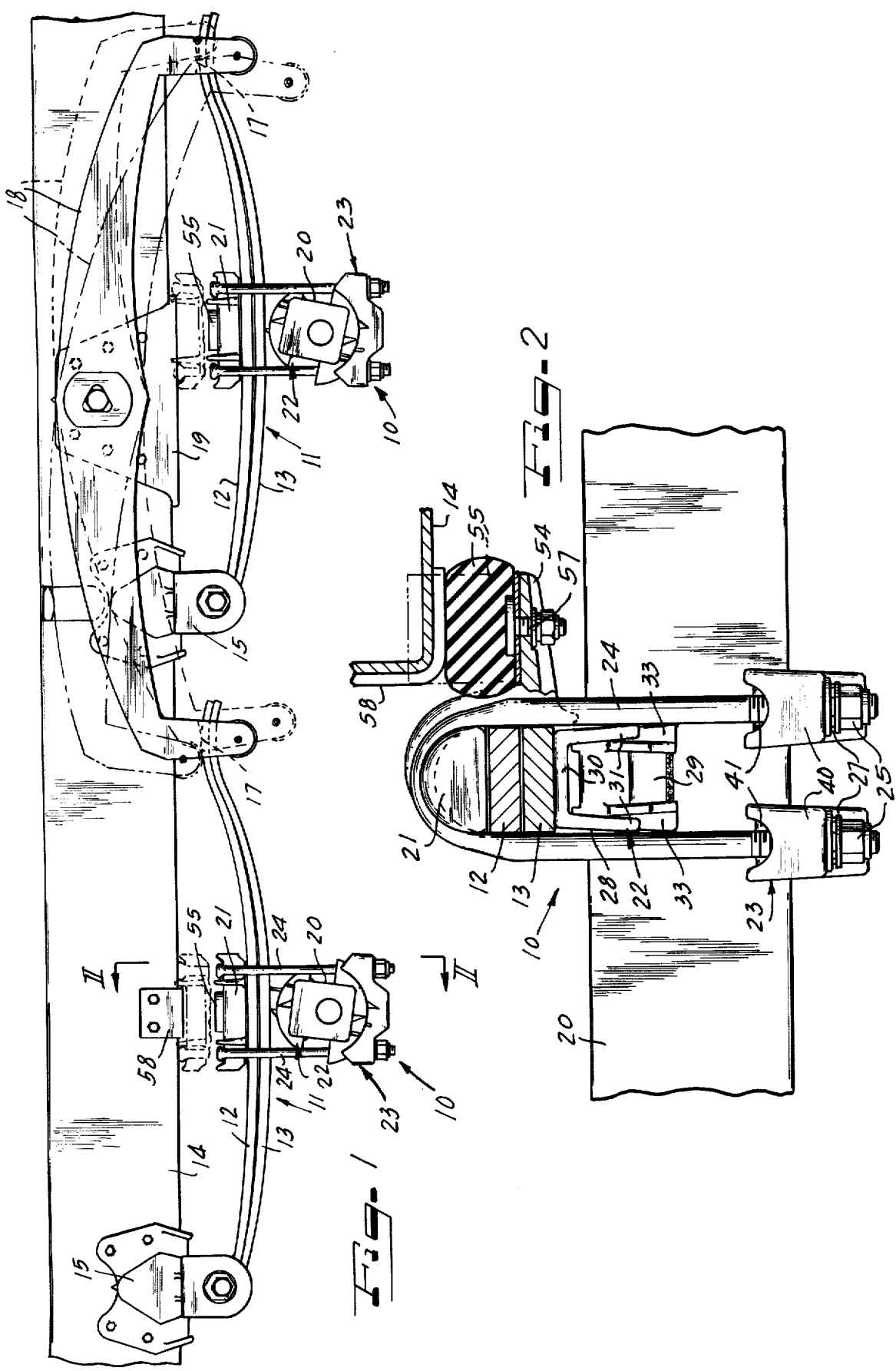

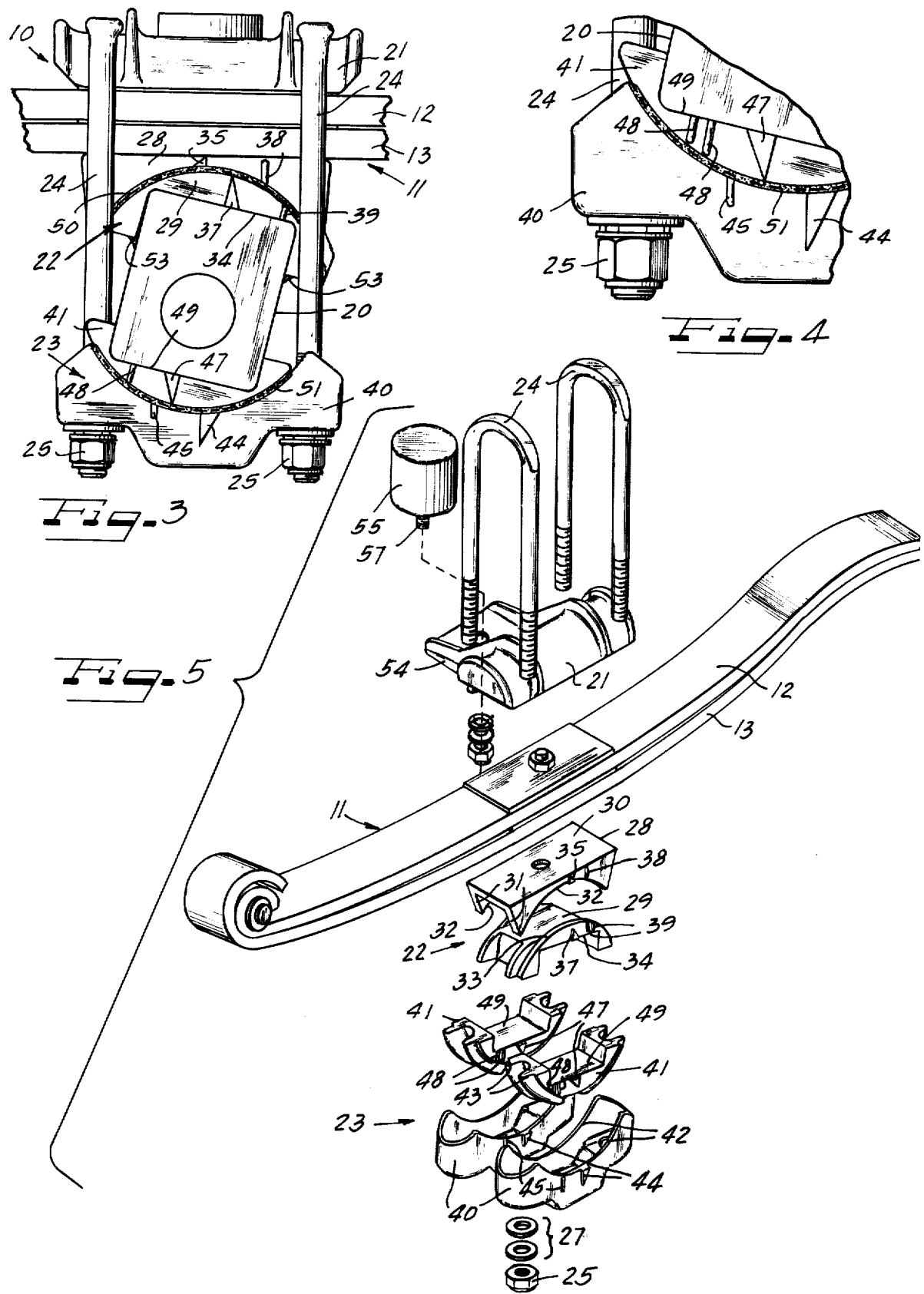

UNIVERSAL AXLE PAD AND CLAMP ASSEMBLIES FOR VEHICLE SUSPENSIONS

This invention relates generally to improvements in suspensions for automotive vehicle trucks and trailers, and is more particularly concerned with the provision of universal axle pad and clamp assemblies for connecting leaf spring means with axle housings in such vehicle suspensions.

Attention is invited to McGee U.S. Pat. No. 3,580,347 as representative of the principal prior art disclosure within the applicants' present knowledge. Herein the disclosure relates to improvements in the axle pad and clamp assemblies for connecting the leaf springs with the axle housings in that type of vehicle suspension.

According to the aforesaid patent, a tandem axle suspension includes two pairs of leaf springs and a rocker arm in the system. Each pair of the springs has a forward end connection to a vehicle frame hanger bracket and a rear end connection to the rocker arm which is intermediately pivotally mounted on the frame. Each of the springs is connected in load supporting relation upon one of the respective axle housings. In that patent, a clamp assembly for connecting the springs with the axle housings is provided wherein the spring is engaged between a cap member and a seat member which also serves as an axle pad engaging the top of the associated axle housing, the underside of the axle housing being engaged by axle clamp structure and the assembly secured together in clamping relation by means of U-bolts. Such clamp assembly performs very well for the intended purpose.

However, the prior clamp assembly was inflexible with regard to different sizes of axle housings and pinion angle requirements, thus necessitating a substantial variety of stock parts, and more particularly the spring seat and axle pad parts and the axle clamp parts.

An important object of the present invention is to improve upon the identified prior structure, provide what may be referred to as a universal axle pad and clamp assembly for connecting leaf spring means in load-supporting relation with an axle housing in a vehicle suspension, permit simple and easy adjustments to accommodate any pinion angle requirements within a substantial range, and reduce the number of more expensive parts that need be kept in stock. To the attainment of the foregoing object, a universal axle pad and clamp assembly for connecting leaf spring means in load-supporting relation with an axle housing in a vehicle suspension is provided comprising spring cap means, spring seat and axle pad means including a spring seat member and an axle pad adapter relatively adjustably engagedly related, axle clamp means including an axle clamp member and an axle clamp adapter relatively adjustedly engagedly related, and U-bolt means for securing the spring cap, the spring seat and axle pad means and the axle clamp means in fixed clamped relation to spring means received between the cap and spring seat member and an axle housing received between the axle pad adapter and the axle clamp adapter.

Other objects, features and advantages of the invention will be readily apparent from the following description of certain preferred embodiments thereof, taken in conjunction with the accompanying drawings although variations and modifications may be effected without departing from the spirit and scope of the novel concepts embodied in the disclosure, and in which:

FIG. 1 is a side elevational view of a spring suspension system embodying features of the invention;

FIG. 2 is an enlarged sectional elevational detail view taken substantially along the line II—II of FIG. 1;

FIG. 3 is an enlarged fragmentary front elevational view of the clamp assembly associated with the forward spring assembly in FIG. 1;

FIG. 4 is a fragmental enlarged front elevational view of a part of the rear clamp assembly in FIG. 1; and FIG. 5 is an exploded assembly view of one of the clamp assemblies.

A dual leaf spring suspension system is depicted in FIG. 1, embodying universal axle pad and clamp assemblies according to the present invention respectively associated with preferably identical front and rear elongated and longitudinally aligned leaf spring assemblies 11 each of which comprises an upper spring member 12 and a lower spring member 13 in downwardly bowed or cambered nested relation. At their forward end portions, the spring assemblies 11 are suitably connected in load supporting relation to a vehicle frame 14 by means including respective hanger brackets 15. At their rear end portions the spring assemblies 11 are engaged in load supporting relation with respective cam surfaces 17 at the front and rear end portions of a walking beam or rocker arm 18 which is intermediately rockably supported on the frame 14 by means including a bracket 19 whereby the rocker arm is adapted for rocking movements within a substantial range as indicated by the dot dash and dash line phantom representations in FIG. 1.

Intermediate their ends and preferably centrally the leaf spring assemblies are connected in load supporting relation with respective axle housings 20 which are of the conventional generally rectangular cross section. For this purpose, each of the clamp assemblies 10 includes spring cap means desirably in the form of a metal casting 21 (FIGS. 1, 2 and 5) engageable upon the upper central portion of the upper spring member 12 of the spring assembly 11. Engageable under the central portion of the lower spring member 13 in alignment with the cap 21 are spring seat and axle pad means 22 engageable with the top of the axle housing 20 in cooperation with axle clamp means 23 engageable with the underside of the associated axle housing 20. Securing the clamp assembly 10 together and in fixed clamped relation to the spring assembly 11 and axle housing 20 is a pair of U-bolts 24 which have their yokes engaged with the spring cap 21 and are secured at the lower end portions of their shanks as by means of lock nuts 25 and washers 27 to the axle clamp means 23, whereby to secure the clamp assembly fixedly with the associated spring assembly 11 and axle housing 20.

In order to permit easy adjustments in the clamp assemblies 10 for accommodating pinion angle requirements within a substantial range, and to accommodate for various axle housing sizes, the spring seat and axle pad means 22 and the axle clamp means 23 are constructed of relatively adjustably and engagedly related parts. To this end, the axle pad means 22 include a spring seat member 28 and an axle pad adapter 29 relatively adjustedly engagedly related. Accordingly, the spring seat member 28 comprises a seat portion 30 suitably elongated and engageable against the underside of the spring 13 and provided with a pair of spaced longitudinal depending flanges 31 having semicircular recesses 32 within which are engageable complementary semicircular shoulder surfaces 33 on the associated axle pad adapter 29. For engagement with the associated axle housing 20, the adapter 29 is provided with a recess 34 which is shaped complemtary to the upper portion of the axle housing 20. Through this arrangement the spring seat member 28 may be of a standard size, and the axle pad adapter may be selected for size of the axle housing receiving recess 34 specially dimensioned for the particular size of the axle housing with which it must be assembled.

By having the engaging surfaces 32 of the seat member 28 and the complementary shoulder surfaces 33 of the axle pad adapter 29 semicircular, suitable relative adjustments of these parts can be easily effected about the axis of axle in the associated housing 20 for the particular pinion angle required. In this instance the pinion angle adjustment by reason of the semicircularity of the engaging surfaces may be effected between 0° and 12°. To facilitate visually determining the proper relative adjusted position of the spring seat member 28 and the axle pad member 29, indexing means are provided comprising a center indicator 35 on the outer face of the seat member and a corresponding center indicator 37 on the outer face of the adapter member 37. In addition, the seat member 28 has a side indicator 38 and the outer face of the adapter 29 has one or more side indicators 39. By preference one such side indicator 39 is provided in respect to the axle pad adapter 29 of the front axle clamp assembly 10 (FIGS. 1 and 3), and two such side indicators 39 are provided on the adapter 29 of the rear axle clamp (FIGS. 1 and 5), in the tandem suspension system.

To the same end, the axle clamp means 23 comprise relatively angularly adjustably engagedly related members, in a preferred construction comprising an axle clamp member 40 and a cooperative axle clamp adapter 41 for clamping cooperation with the legs of the U-bolts 24 at each side of the associated spring assembly 11 and under the associated axle housing 20. Each of the clamp members 40 is provided with spaced coextensive semicircular seats 42 which are engaged in angularly adjustable relation by complementary semicircular shoulders 43 on the adapter members 41. Complementary to the same indicators as on the spring seat and axle pad means 22, the axle clamp members 40 have respective center indicators 44 and side indicators 45. Corresponding respective center indicators 47 and side indicators 48 are provided on the outer faces of the axle clamp adapters 41, there being one of the indicators 48 on the front axle clamp assembly 10 and two of the indicators 48 on the rear axle clamp assembly. Each of the adapters 41 has a seat recess 49 of compelementary size for the lower portion of the axle housing 20 to be received therein.

Before assembling the respective clamp assemblies with the spring assembly 11 and the axle housing 20 with which the clamp assembly is to be used, the axle pad adapter 29 and axle clamp adapters 41 are selected for the known size of the axle housing 20. Assembly of the axle pad adapter 29 with the spring seat member 28 is then effected and these two elements relatively rotated until the angle indicated by the indicators of the spring seat and axle pad adapter show the required pinion angle for the axle housing with which to be associated. Permanent connection of the spring seat member 28 and the adjusted axle pad adapter 29 is then effected as by means of welding 50. To similar effect, the axle clamp adapters 41 are selected for the size of the axle housing 20 and are assembled with the axle clamps 40 in appropriately angularly adjusted relation complementary to the spring seat member 28 and axle pad adapter 29 to be associated in the same clamp assembly 10. The assembled axle clamp and axle clamp adapter in each instance are permanently secured together in their relatively adjusted relation in the required pinion angle as shown by their indicators, by suitable means such as welding 51. By preference, the axle pad adapters 29 are also fixedly secured to the axle housing 20 as by means of welding 53. As a result, when the axle pad and spring means 22 and the axle clamp means 23 are fixed by the U-bolts 24 in assembly with the associated springs 11 and axle housing 20, a solid, durable clamping engagement is maintained in service. The pinion angle remains positive.

All of the spring caps 21, the spring seats 28, the adapters 29 and 41 and the clamp members 40 may be constructed as forged or cast steel parts. Although different adapters 29 and 41 are provided for various axle housings, the number of stock parts is substantially reduced because for each size of axle housing, the required pinion angle can be very easily adjusted throughout a substantial range, as has been explained. Providing the adapters 29 and 41 in the few different sizes of axle housings that must be accommodated, economy is effected because the spring seat members 30 and the axle clamp members 40 are constructed according to standard dimensions for use with any size of adapters.

In addition to its function as a spring cap, each of the members 21 is desirably also provided with a rearward shelf extension 54 (FIGS. 2 and 5) serving as a support for an auxiliary spring bumper 55, preferably in the form of an elastomeric block secured thereto as by means of a stud screw 57 and projecting normally upwardly as shown in full line in FIG. 2. The purpose of the auxiliary spring 55 is to limit axle vertical movement so that spring load on the metal springs 12 and 13 in the spring assemblies 11 can be kept below a detrimental value. Under excessive suspension random loads, the auxiliary springs 55 engage against the frame 14 and compress as indicated on comparison of the unloaded dash line position and the loaded compressed position in full line in FIG. 2. To reinforce the frame 14 against impact from the springs 55, a reinforcing bumper bracket 58 is mounted on the frame 14 over the spring 55 of the front spring assembly. At the rear spring assembly, the rocker arm bracket 19 provides such reinforcement.

It will be understood that variations and modifications may be effected without departing from the spirit and scope of the novel concepts of this invention.

We claim as our invention:

1. A universal axle pad and clamp assembly for connecting leaf spring means in load-supporting relation with an axle housing in a vehicle suspension, comprising:

spring cap means;

spring seat and axle pad means including a spring seat member and an axle pad adapter relatively adjustably engagedly related;

a pair of spaced axle clamp members and a pair of complementary axle clamp adapters relatively adjustably engaged with said axle clamp members;

and a pair of U-bolts for securing the spring cap, the spring seat and axle pad means and the pairs of engaged axle clamp members and clamp adapters in fixed clamped relation to spring means received between said cap and spring seat member and an axle housing received between said axle pad adapter and said axle clamp adapter.

2. An assembly according to claim 1, wherein said spring seat member and axle pad adapter have semicircular engaging surfaces for effecting relative angular adjustments of the member and adapter, and each of said axle clamp members and said axle clamp adapters having a pair of semi-circular engagement surfaces enabling angular adjustments corresponding to the adjustments of the spring seat member and axle pad adapter.

3. An assembly according to claim 1, wherein said axle pad adapter and each of said axle clamp adapters have respective axle housing receiving recesses.

4. A universal axle pad and clamp assembly for connecting leaf spring means in load-supporting relation with an axle housing in a vehicle suspension, comprising:

spring cap means;

spring seat and axle pad means including a spring seat member and an axle pad adapter relatively adjustably engagedly related;

axle clamp means including an axle clamp member and an axle clamp adapter relatively adjustably engagedly related;

U-bolt means for securing the spring cap, the spring seat and axle pad means and the axle clamp means in fixed clamped relation to spring means received between said cap and spring seat member and an axle housing received between said axle pad adapter and said axle clamp adapter; and each of said spring seat member and said axle pad adapter having a single center indicator and at least one side indicator thereon to facilitate attaining desired relative adjustments of the spring seat member and the axle pad adapter.

5. A universal axle pad and clamp assembly for connecting leaf spring means in load-supporting relation with an axle housing in a vehicle suspension, comprising:

spring cap means;

spring seat and axle pad means including a spring seat member and an axle pad adapter relatively adjustably engagedly related;

axle clamp means including an axle clamp member and an axle clamp adapter relatively adjustably engagedly related;

U-bolt means for securing the spring cap, the spring seat and axle pad means and the axle clamp means in fixed clamped relation to spring means received between said cap and spring seat member and an axle housing received between said axle pad adapter and said axle clamp adapter; and each of said axle clamp members and each of said axle clamp adapters having indicator means to facilitate attaining accurate relative desired adjustments of each of the pairs of axle clamp members and axle clamp adapters.

6. A universal axle pad and clamp assembly for connecting leaf spring means in load-supporting relation with an axle housing in a vehicle suspension, comprising:

spring cap means comprising a member having a shelf extension;

spring seat and axle pad means including a spring seat member and an axle pad adapter relatively adjustably engagedly related;

axle clamp means including an axle clamp member and an axle clamp adapter relatively adjustably engagedly related;

U-bolt means for securing the spring cap, the spring seat and axle pad means and the axle clamp means in fixed clamped relation to spring means received between said cap and spring seat member and an axle housing received between said axle pad adapter and said axle clamp adapter; and compression spring means supported by said shelf extension.

7. In combination in a leaf spring suspension including leaf spring means connected at opposite ends in load supporting relation to a vehicle frame, and a clamp assembly securing the spring means to an axle housing, the improvements comprising:

the clamp assembly including a spring cap member engaging on top of the spring means, a spring seat member engaging the spring means, an axle pad adapter adjustably connected with the spring seat member and engaging the upper portion of the axle housing, and axle clamp means connected in adjusted relation with axle pad adapter means engaging the lower portion of the axle housing;

means securing the clamp assembly together and onto the spring means and the axle housing; and a shelf extension on said spring cap member supporting an auxiliary compression spring.

8. In combination in a leaf spring suspension including leaf spring means connected at opposite ends in load supporting relation to a vehicle frame, and a clamp assembly securing the spring means to an axle housing, the improvements comprising:

the clamp assembly including a spring cap member engaging on top of the spring means, a spring seat member engaging the spring means and an axle pad adapter adjustably connected with the spring seat member and engaging the upper portion of the axle housing;

a pair of spaced axle clamp members engaging the lower portion of the axle housing below said axle pad adapter;

a pair of complementary clamp adapters respectively relatively adjustably engaged with said axle clamp members; and a pair of U-bolts securing the spring cap member, the spring seat member and axle pad adapter and the pairs of engaged axle clamp members and axle clamp adapters in fixed clamped relation to the spring means and the axle housing.

9. A combination according to claim 8, wherein said spring seat member and axle pad adapter have semicircular engaging surfaces for effecting relative angular adjustments of the member and adapter, and each of said axle clamp members and said axle clamp adapters having a pair of semicircular engagement surfaces enabling angular adjustments corresponding to the adjustments of the spring seat member and axle pad adapter.

10. A combination according to claim 9, wherein each of said axle clamp members and each of said axle clamp adapters has indicator means to facilitate attaining accurate relative desired adjustments of each of the pairs of axle clamp members and axle clamp adapters.

11. A combination according to claim 8, wherein said spring cap member has a shelf extension, and compression spring means supported by said shelf extension.

* * * * *